(12) United States Patent
Nikonov et al.

(10) Patent No.: US 6,888,668 B2
(45) Date of Patent: May 3, 2005

(54) OPTICAL AMPLIFIER WITH MULTIPLE WAVELENGTH PUMP

(75) Inventors: Dmitri E. Nikonov, San Jose, CA (US); Christopher J. Scholz, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 146 days.

(21) Appl. No.: 10/020,144

(22) Filed: Dec. 13, 2001

(65) Prior Publication Data

US 2003/0112498 A1 Jun. 19, 2003

(51) Int. Cl.[7] .................................................. H01S 3/00
(52) U.S. Cl. ...................... 359/333; 359/341.3
(58) Field of Search ................ 359/342, 333, 359/341.3

(56) References Cited

U.S. PATENT DOCUMENTS

| | | | |
|---|---|---|---|
| 4,515,431 A | | 5/1985 | Shaw et al. |
| 4,785,459 A | | 11/1988 | Baer |
| 5,181,223 A | | 1/1993 | Baer |
| 5,227,913 A | * | 7/1993 | McCaughan et al. ....... 359/341 |
| 5,271,031 A | | 12/1993 | Baer |
| 5,365,538 A | | 11/1994 | Tumminelli et al. |
| 5,463,649 A | | 10/1995 | Ashby et al. |
| 5,535,051 A | * | 7/1996 | Basiev et al. ............... 359/342 |
| 5,761,234 A | | 6/1998 | Craig et al. |
| 5,774,488 A | | 6/1998 | Kmetec |
| 5,920,423 A | * | 7/1999 | Grubb et al. ............... 359/341 |
| 5,982,802 A | | 11/1999 | Thony et al. |
| 6,069,907 A | | 5/2000 | Chang |
| 6,160,824 A | | 12/2000 | Meissner et al. |
| 6,212,310 B1 | | 4/2001 | Waarts et al. |
| 6,243,515 B1 | | 6/2001 | Heflinger et al. |
| 6,289,027 B1 | | 9/2001 | Lawrence et al. |
| 6,356,574 B1 | * | 3/2002 | Craig et al. .................... 372/75 |
| 6,418,156 B1 | | 7/2002 | Peressini |
| 6,459,829 B1 | | 10/2002 | Yamauchi et al. |
| 6,493,476 B2 | * | 12/2002 | Bendett ....................... 385/14 |
| 6,721,087 B2 | | 4/2004 | Alduino et al. |

FOREIGN PATENT DOCUMENTS

| | | |
|---|---|---|
| EP | 0 821 451 | 1/1998 |
| EP | 0128333 A2 | 8/2000 |
| FR | 2 784 809 | 1/1998 |
| JP | 2001-308422 A | 11/2001 |
| WO | WO 87/04881 | 8/1987 |
| WO | WO 01/28049 * | 3/2001 |
| WO | WO 01/28049 | 4/2001 |
| WO | PCT/US 02/37677 | 11/2002 |
| WO | PCT/US 02/37696 | 11/2002 |
| WO | WO 03/052887 | 6/2003 |
| WO | WO 03/052888 | 6/2003 |

OTHER PUBLICATIONS

R.J. Beach, et al.; "Continuous–wave and passively Q–switched cladding–pumped planar waveguide lasers", Optics Letters, Optical Society of America, vol. 26, No. 12, Jun. 15, 2001. pp. 881–883. XP–001103481, ISSN: 0146–9592.

* cited by examiner

*Primary Examiner*—Mark Hellner
(74) *Attorney, Agent, or Firm*—Kenneth J. Cool

(57) ABSTRACT

An optical amplifier comprises a substrate, an optical multiplexer embedded in the substrate, pump light sources with multiple wavelengths coupled to the optical multiplexer, and an amplification waveguide coupled to the multiplexer. In one embodiment an optical signal is directed to another waveguide in the substrate. In another embodiment, the amplification waveguide is doped with a rare earth element.

24 Claims, 5 Drawing Sheets

OPTICAL AMPLIFIER WITH MULTIPLE WAVELENGTH PUMP

FIELD

The described invention relates to the field of optical signal amplification. In particular, the invention relates to amplifying an optical signal using pumping light beams having multiple wavelengths.

BACKGROUND

A waveguide may serve as an optical amplifier by doping it with ions of a rare earth element such as Erbium. An optical signal propagating in the waveguide is amplified when a pumping light beam is introduced. For example, Erbium ions, excited to a higher energy state with a pumping light beam having a wavelength of approximately 980 nm or 1480 nm, will amplify an optical signal in a wide wavelength band around 1530–1600 nm as the Erbium ions fall down to a lower energy state. This technique is well-known in optical fiber amplification.

FIG. 1 is a schematic diagram showing one prior art method of amplifying an optical signal 10 in a planar waveguide 20. The waveguide 20 is embedded in a substrate 30 and doped with Erbium ions. An optical signal 10 is directed into the waveguide 20 and propagates through the waveguide 20. A laser 50 supplies pumping light beams into the waveguide 20 in a co-propagating direction, i.e., in substantially the same direction as the optical signal propagates. The signal 10 and the pump 50 are combined to the same waveguide 20, for example, in an evanescent directional coupler. In one example, an optical signal 10 having wavelength of approximately 1550 nm is amplified as laser 50 supplies pumping light beams of approximately 980 nm or 1480 nm wavelength.

FIG. 2 is a schematic diagram showing another prior art method of amplifying an optical signal. In FIG. 2, a pump laser 50 is directed from the opposite end of the waveguide 20 to pump light in a counter-propagating direction, i.e., in a direction opposite to that of the optical signal. Similar to FIG. 1, the optical signal is amplified within the waveguide 20 and then exits the substrate 30.

Modern optical networks use single-mode optical fibers for transmission over long distances. This avoids signal degradation coming from chromatic dispersion, i.e. dependence of the speed of the light on its wavelength. For efficient interfacing with single mode fibers, all optical components, including fiber or waveguide amplifiers, are effectively single-mode. Due to a general principle of optics, "brightness conservation theorem", power of light in a single mode cannot be increased using just linear passive (not adding energy) optical elements. This results in a fact that the power of light with a certain wavelength from only one mode can be coupled to a single mode waveguide. For amplifiers, it translates that only one pump laser with a certain wavelength can supply pump light in each direction of propagation and each polarization.

The optical signal experiences gain in an optical amplifier provided that the intensity of the pump is higher than a certain threshold value dependent on the intensity of the optical signal and material properties of the optical amplifier. In order to achieve high enough gain, the intensity of the pump must be much higher than the threshold value. Consequently, a high power of a pump laser is typically required.

There are several disadvantages of the above methods compared to the invention described below. First, the relatively high power laser used in the described co-propagating and counter-propagating amplification is expensive. Second, high power lasers have a high power dissipation, which may cause thermal issues in their packaging. Third, the reliability of high power lasers is generally not as good as that of lower power lasers.

BRIEF DESCRIPTION OF THE DRAWINGS

FIG. 8A shows the power of the pumps provided at each end of the amplification waveguide and their decrease in power within the amplification waveguide. FIG. 8B shows the increase in power of the optical signal.

DETAILED DESCRIPTION

An apparatus and method for amplifying an optical signal using multiple wavelength pumping light beams is disclosed. Multiple lower-power light sources provide the pumping light beams. In one embodiment, laser diodes provide the pumping light beams into an optical multiplexer where all the pumping light beams are combined. The optical multiplexer is coupled to a waveguide where the optical signal is to be amplified. The combined optical signal and multiple wavelength pumping light beams are routed to an amplification waveguide, in which the optical signal is amplified.

Figure 3:
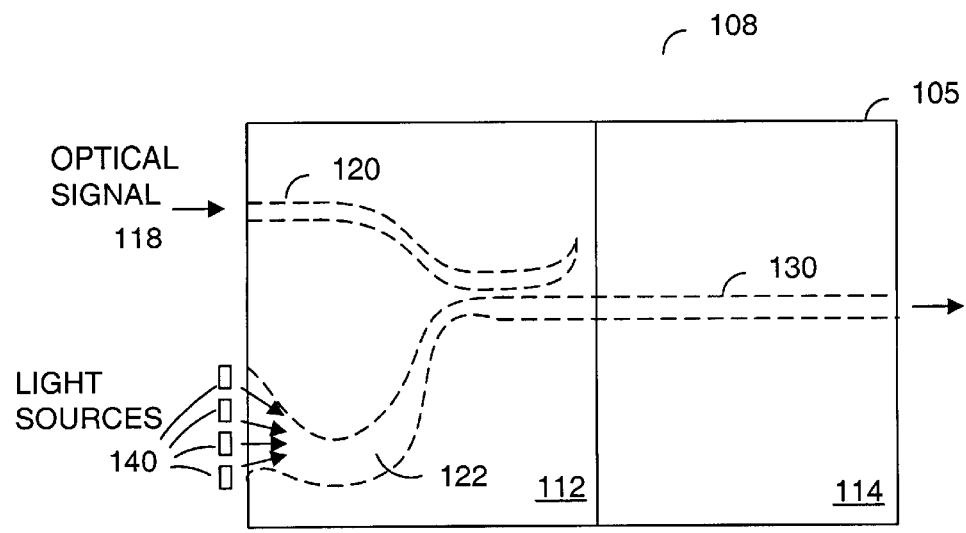
FIG. 3 is a schematic diagram showing one embodiment of an optical amplifier using multiple-wavelength pumping light beams.

FIG. 3 is a schematic diagram showing one embodiment of an optical amplifier using multiple-wavelength pumping light beams. In one embodiment, the optical amplifier 108 comprises a device substrate 105 having an undoped portion 112 and a doped portion 114. In one embodiment, a rare earth element such as Erbium is used as the dopant. However, other dopants may be used to provide the desired amplification.

An optical signal 118 is input via a waveguide 120 that is embedded within the substrate 105. There are various ways to fabricate a waveguide embedded in a substrate, such as by diffusion of various ionic species, etching, and epitaxial growth. "Embedded within a substrate" is meant to include these various ways, including silicon-on-insulator. In some cases, the waveguide may actually be deposited on top of a substrate and covered with a cladding material different from the substrate, but is also meant to be covered by the term "embedded within a substrate".

In one embodiment, an array waveguide grating serves as the optical multiplexer 122. In another embodiment, an echelle grating serves as the optical multiplexer 122. In one embodiment, the waveguide 120 and the optical multiplexer 122 are evanescently coupled together with a spacing between them down to a few microns. In another embodiment, the waveguide 120 is coupled to a waveguide 130 having the multiplexed pumping light beams after they have been multiplexed together.

After the optical signal 118 is coupled to the multiple wavelength pumping light beams, the combined light beams coexist within amplification waveguide 130. In one embodiment, the waveguide 120 and the optical multiplexer 122 are located in the undoped portion 112 of the device substrate, and the amplification waveguide 130 is located in the doped portion 114 of the device substrate.

In one embodiment, a plurality of laser diodes 140 provides multiple wavelengths of pumping light beams centered about a base wavelength. For example, the laser diodes may provide pumping light beams centered about 980 nm with small variations. Pumping light beams centered about 980 nm with a 2 nm variation include 980 nm, 980 nm+/−2 nm, 980 nm+/−4 nm, and so forth.

Although the variations from the center wavelength need not be periodic or identical, if they overlap too closely with other wavelengths then the power of that wavelength will not be efficiently transferred into the amplification waveguide due to the conservation of brightness in passive components. For example, if four light sources each having power P and identical wavelength were multiplexed together into the amplification waveguide, the amount of power transferred to the amplification waveguide is approximately P (less some loss). Approximately 3P power would be reflected or scattered. On the other hand, if the four light sources each have power P and slightly different wavelengths, the amount of power transferred to the amplification waveguide is 4P (less some loss).

Figure 1:
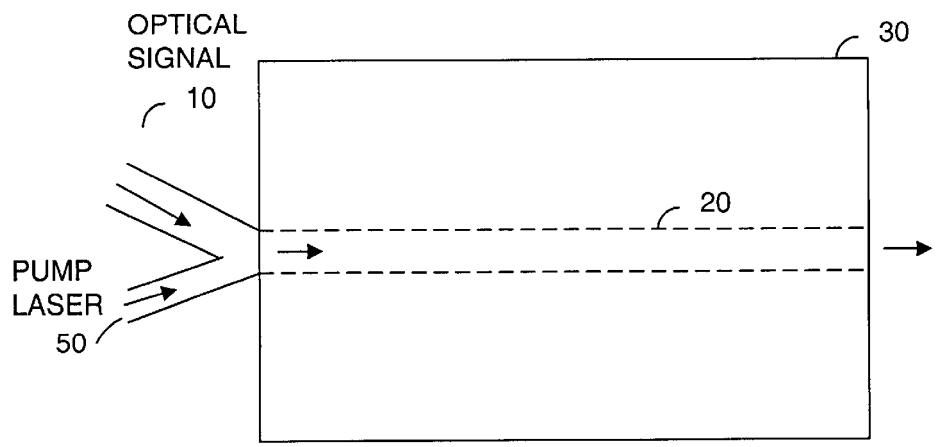
FIG. 1 is a schematic diagram showing a prior art method of amplifying an optical signal in a planar waveguide.
Figure 2:
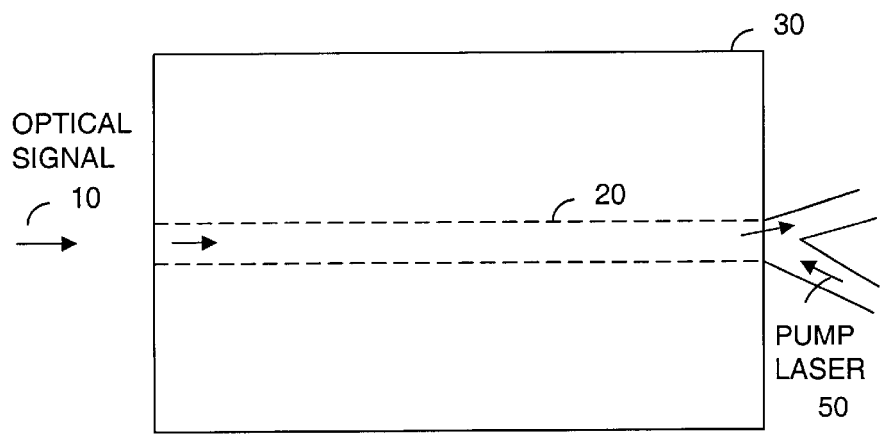
FIG. 2 is a schematic diagram showing another a prior art method of amplifying an optical signal.

In one embodiment, Vertical Cavity Surface Emitting Lasers (VCSELs) are used to provide the pumping light beams. Low power VCSELs may be used for the amplification. For example, a VCSEL may emit, but is not limited to, less than 20 mW of power. Comparable high power lasers used in co-propagation and counter-propagation architectures as shown in FIGS. 1 and 2 use higher power lasers, such as, but not limited to, 100 mW. By using VCSELs having slightly different wavelengths, the power of the VCSELs add together, as will be shown with respect to FIGS. 6, 7, 8A and 8B.

Figure 4:
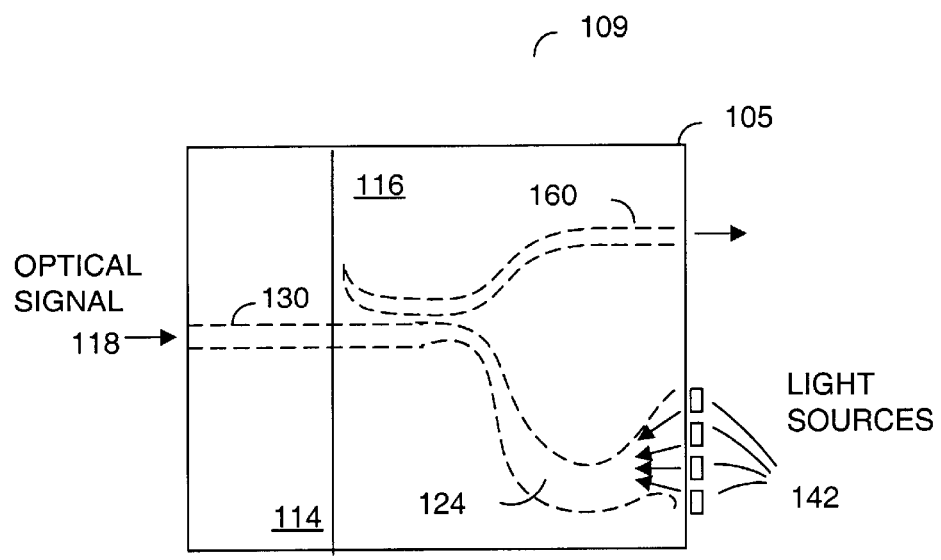
FIG. 4 is a schematic diagram showing a second embodiment of an optical amplifier using multiple-wavelength pumping light beams.

FIG. 4 is a schematic diagram showing a second embodiment of an optical amplifier 109 using multiple-wavelength pumping light beams. In this embodiment, the light sources 142 provide pumping light beams in a counter-propagating direction to that of the optical signal 118.

The optical signal 118 is input into amplification waveguide 130, which is in the doped section 114 of the device substrate 105. The light sources 142 provide pumping light beams similar to the light sources 140 as previously described with respect to FIG. 3. The pumping light beams are combined in an optical multiplexer 124 and then directed into the amplification waveguide 130, where the optical signal 118 is amplified. In one embodiment, the doped region 114 is doped with Erbium, the optical signal is approximately 1550 nm, and the pumping light beams are centered about either 980 nm or 1440 nm.

In one embodiment, an output waveguide 160 is evanescently coupled to one end of waveguide 130, and the amplified signal is transferred to the output waveguide 160.

Similar to FIG. 3, the substrate 105 comprises an undoped portion 116 and a doped portion 114. In one embodiment, waveguide 160 and optical multiplexer 124 are located in the undoped portion 116 of the substrate 105.

Figure 5:
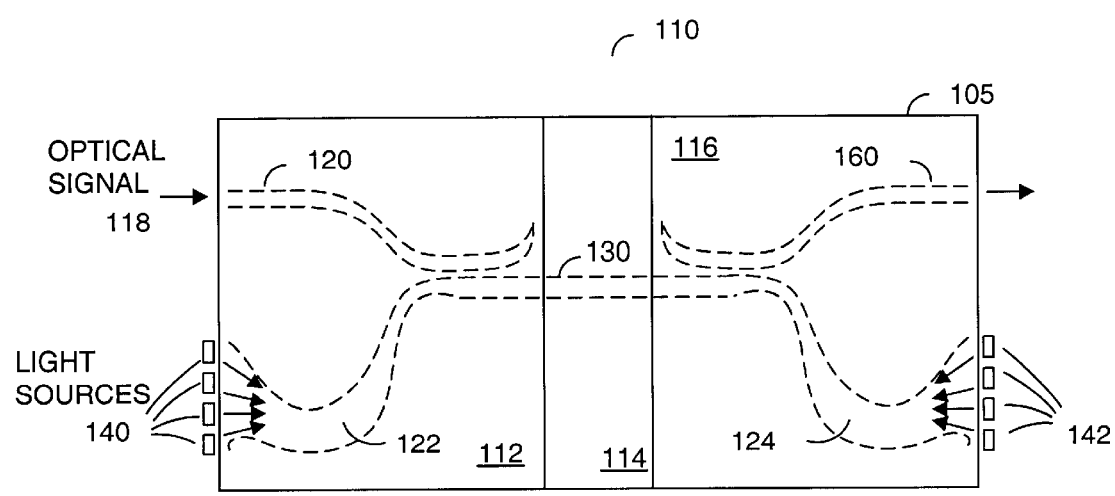
FIG. 5 is a schematic diagram showing a third embodiment of an optical amplifier using co-propagating and counter-propagating multiple-wavelength pumping light beams.

FIG. 5 is a schematic diagram showing a third embodiment of an optical amplifier 110 combining both the co-propagating and counter-propagating multiple-wavelength pumping light beams described in FIGS. 3 and 4, respectively. This embodiment includes a device substrate having undoped portions 112 and 116 and doped portion 114.

An optical signal 118 is input into waveguide 120, which is evanescently coupled into amplification waveguide 130. Light sources 140 provide multiple wavelength pumping light beams into an optical multiplexer 122 which is also coupled into the amplification waveguide 130, and light sources 142 provide multiple wavelength pumping light beams into an optical multiplexer 124 which is also coupled into the amplification waveguide 130.

The optical signal 118 is amplified in the amplification waveguide 130 and is then coupled into the waveguide 160, from which it exits the device substrate 105.

In the FIGS. 3, 4, and 5, the various waveguides 120, 130 and 160 and the multiplexers 122 and 124 (e.g. array waveguide gratings or echelle gratings) may be formed in substrate 105 in a variety of different ways, such as by diffusion of various ionic species, etching, and/or epitaxial growth, as are well-known. For example, in one embodiment, a glass substrate may be used, and ion diffusion may be employed to create waveguides in the glass. Furthermore, a doped portion of substrate 105 may be fused with an undoped portion of substrate 105 prior to diffusion, as is well-known. In another embodiment, a silicon substrate may be used. Silicon oxide may be deposited for cladding, and etching may be used to remove the non-waveguide material. An upper cladding of, e.g., silicon oxide, may then be deposited on top of the waveguides 120, 130 and 160.

In one embodiment, the light sources 140, 142 are coupled to the optical multiplexer 122, 124 via optical fibers (not shown). In another embodiment, the light sources 140, 142 are coupled directly to the substrate 105.

Additionally, in one embodiment, the light sources 140 may provide a first set of pumping light beams centered around a first wavelength, and the light sources 142 may provide a second set of pumping light beams centered around a second wavelength that is different from the first wavelength.

Figure 6:
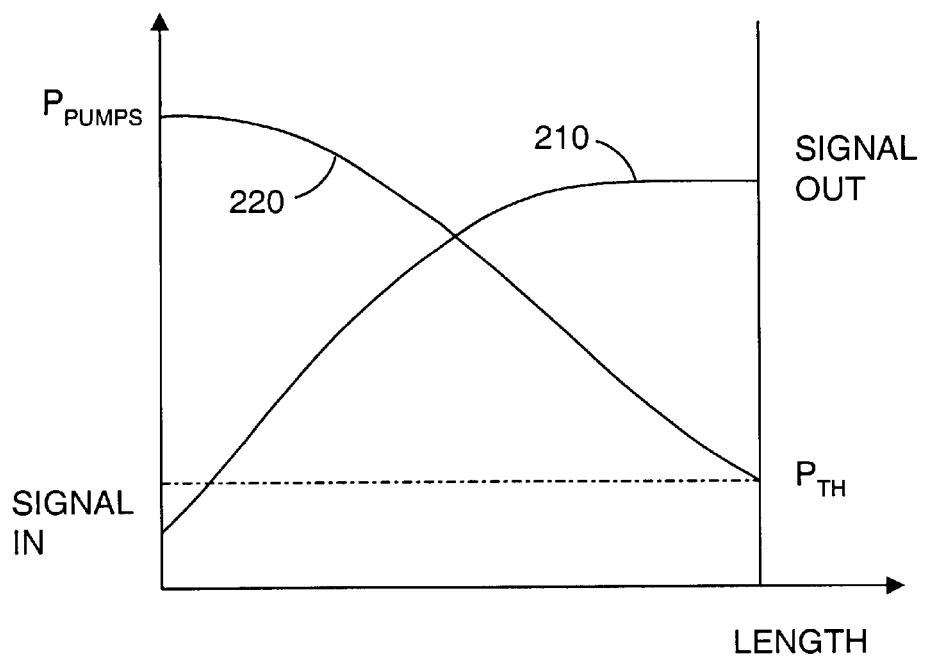
FIG. 6 is an example graph illustrating an increase in optical signal power based on the optical pumping.

FIG. 6 is an example graph corresponding to FIG. 3 illustrating an increase in optical signal power 210 along the length of the amplification waveguide 130 based on the optical pumping 220. In one embodiment, the light sources 140 provide a power over a particular threshold Pth in order to provide gain. The number and power of the light sources 140 can be configured so that the total pump power at the end of the amplification waveguide is above the threshold Pth, so that amplification throughout the entire length of the amplification waveguide 130 is achieved. By combining the multiple wavelength pumping light beams, the power of the optical signal is raised even though individual lower-power laser diodes may provide a pumping light beam that may not be significantly above the gain threshold Pth. Lower power laser diodes have the advantage of generally being cheaper and more reliable than higher power laser diodes, as previously mentioned.

Figure 7:
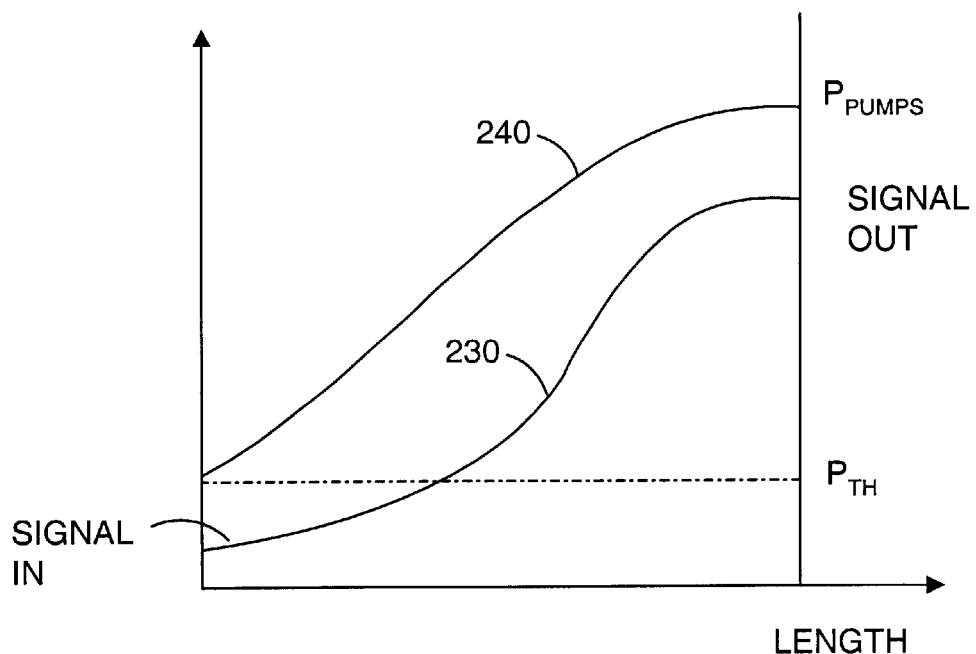
FIG. 7 is an example graph corresponding to FIG. 4 illustrating an increase in optical signal power along the length of the amplification waveguide based on the optical pumping.

FIG. 7 is an example graph corresponding to FIG. 4 illustrating an increase in optical signal power 230 along the length of the amplification waveguide 130 based on the optical pumping 240. The optical signal 118 is amplified even though the pumping light beams are provided in a counter-propagating direction.

Figure 8A:
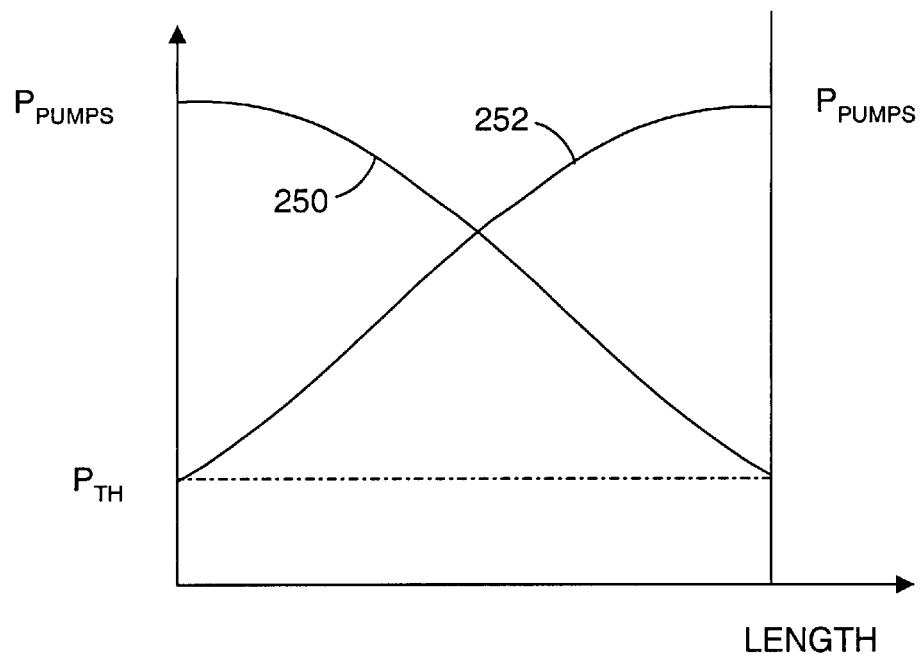
FIGS. 8A and 8B are example graphs corresponding to FIG. 5 illustrating an increase in optical signal power along the length of the amplification waveguide.
Figure 8B:
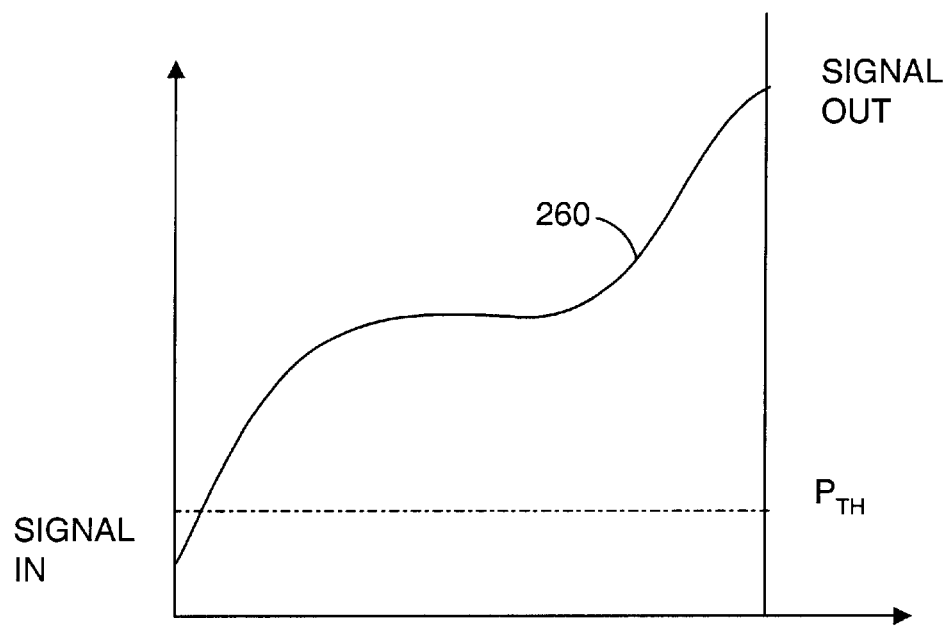

FIGS. 8A and 8B are example graphs corresponding to FIG. 5 illustrating an increase in optical signal power along the length of the amplification waveguide 130. FIG. 8A shows the power 250, 252 of the pumps 140, 142, respectively, provided at each end of the amplification waveguide 130 and their decrease in power within the amplification waveguide. FIG. 8B shows the increase in power of the optical signal 260. As can be seen from the graph, the higher rates of amplification occur at the ends of the amplification waveguides where the power of the pumping light beams are highest.

Thus, an apparatus and method for amplifying an optical signal is disclosed. However, the specific arrangements and methods described herein are merely illustrative. For example, there are various ways to fabricate a waveguide embedded in a substrate, such as by diffusion of various ionic species, etching, and epitaxial growth. One skilled in the art could use any of various methods to fabricate such an embedded waveguide. Numerous modifications in form and detail may be made without departing from the scope of the invention as claimed below. The invention is limited only by the scope of the appended claims.

What is claimed is:

1. An optical amplifier comprising:
   a substrate;
   an optical multiplexer embedded in the substrate, wherein the optical multiplexer is an array waveguide grating and an echelle grating;
   pump light sources with multiple wavelengths coupled to the optical multiplexer; and
   an amplification waveguide coupled to the optical multiplexer.

2. The optical amplifier of claim 1, wherein the amplification waveguide is doped with a rare earth element.

3. The optical amplifier of claim 1, wherein the pump light sources comprise a plurality of laser diodes.

4. The optical amplifier of claim 3, wherein the plurality of laser diodes have a power of approximately 20 mW or less.

5. The optical amplifier of claim 1 further comprising:
   a signal waveguide embedded within the substrate and coupled to the amplification waveguide.

6. A method of amplifying an optical signal comprising:
   producing pumping light beams having multiple wavelengths;
   directing the optical ignal and the pumping light beams into a planar waveguide doped with a rare earth element, and
   multiplexing the pumping light beams into a single-mode waveguide.

7. The method of claim 6, further comprising evanescently coupling the optical signal with the pumping light beams.

8. The method of claim 6, wherein the pumping light beams are multiplexed together using an array waveguide grating.

9. The method of claim 6, wherein the pumping light beams are multiplexed together using an echelle grating.

10. The method of claim 6, wherein producing the pumping light beams is achieved using one or more VCSELs each having a power less than 20 mW.

11. The method of claim 6, wherein directing the optical signal and the pumping light beams into a planar waveguide doped with a rare earth element further comprises directing the optical signal and the pumping light beams into a planar waveguide doped with Erbium.

12. The method of claim 11, wherein the optical signal has a wavelength of approximately 1550 nm, and the pumping light beams are centered about a wavelength of approximately 980 nm or 1480 nm.

13. The method of claim 12, wherein the pumping light beams are produced at wavelengths differing from one another by intervals of approximately 2 nm.

14. The method of claim 8, wherein evanescently coupling the optical signal to the pumping light beams comprises evanescently coupling the optical signal with pumping light beams that are co-propagating with the optical signal.

15. The method of claim 6, wherein evanescently coupling the optical signal to the pumping light beams comprises evanescently coupling the optical signal with pumping light beams that are counter-propagating with the optical signal.

16. An optical amplifier comprising:
    a first waveguide for carrying an optical signal, the first waveguide embedded in a device substrate;
    an array waveguide grating coupled to the first waveguide;
    two or more laser diodes for providing light beams having differing wavelengths into the array waveguide grating; and
    an Erbium-doped amplification waveguide coupled to the array waveguide grating for amplifying the optical signal.

17. The optical amplifier of claim 16, wherein the laser diodes have a power of approximately 20 mW or less.

18. The optical amplifier of claim 17, wherein the laser diodes provide light beams centered about 980 nm and vary by approximately 2 nm from one another.

19. The optical amplifier of claim 17, wherein the laser diodes provide light beams centered about 1480 nm and vary by approximately 2 nm from one another.

20. The optical amplifier of claim 16, wherein the first waveguide is evanescently coupled to the array waveguide grating.

21. The optical amplifier of claim 16, wherein the device substrate is a phosphate glass.

22. The optical amplifier of claim 16, wherein the device substrate comprises silica and silicon.

23. An optipal amplifier comprising:
    a substrate;
    an optical multiplexer embedded in the substrate;
    pump light sources with multiple wavelengths coupled to the optical multiplexer, wherein the pump light sources comprise a plurality of laser diodes and wherein the plurality of laser diodes are Vertical Cavity Surface Emitting Lasers having a power of approximately 20 mW or less; and
    an amplification waveguide coupled to the optical multiplexer.

24. The optical amplifier of claim 23, wherein the optical multiplexer is one of an array waveguide grating and an echelle grating.

* * * * *

UNITED STATES PATENT AND TRADEMARK OFFICE
CERTIFICATE OF CORRECTION

PATENT NO. : 6,888,668 B2
DATED : May 3, 2005
INVENTOR(S) : Nikonov et al.

It is certified that error appears in the above-identified patent and that said Letters Patent is hereby corrected as shown below:

Column 5,
Line 51, delete "ignal" and insert -- signal --.

Signed and Sealed this

Sixteenth Day of August, 2005

JON W. DUDAS
*Director of the United States Patent and Trademark Office*